United States Patent [19]

Younes

[11] Patent Number: 4,668,750

[45] Date of Patent: May 26, 1987

[54] FLAME-RETARDANT MOLDED COMPOSITION WHICH INCORPORATES A POLY(STYRENE-CO-N-PHENYLMALEI-MIDE-CO-DIBROMOSTYRENE) COPOLYMER

[75] Inventor: Usama E. Younes, Newtown Square, Pa.

[73] Assignee: Atlantic Richfield Company, Los Angeles, Calif.

[21] Appl. No.: 919,512

[22] Filed: Oct. 16, 1986

Related U.S. Application Data

[62] Division of Ser. No. 685,362, Dec. 24, 1984.

[51] Int. Cl.$^4$ .................. C08F 214/16; C08L 39/04
[52] U.S. Cl. .................. 526/262; 524/502; 524/516; 525/186; 525/203
[58] Field of Search ............ 526/262; 524/502, 516; 525/186, 203

[56] References Cited

U.S. PATENT DOCUMENTS

| | | | |
|---|---|---|---|
| 3,705,209 | 12/1972 | Matlack et al. | 528/186 |
| 4,072,644 | 2/1978 | Hedrick | 524/548 |
| 4,266,037 | 5/1981 | Di Guilio et al. | 524/548 |
| 4,302,484 | 11/1981 | Rosenkrauz | 526/262 |
| 4,351,932 | 9/1982 | Street et al. | 524/548 |
| 4,388,451 | 6/1983 | Culbertson et al. | 526/262 |

*Primary Examiner*—Morton Foelak
*Attorney, Agent, or Firm*—Dennis M. Kozak

[57] ABSTRACT

A moldable composition which comprises a novel random bromostyrene-containing copolymer and a flame-retardant synergist is disclosed. The molded composition exhibits at least a 94V-1 classification when tested in accordance with Underwriters' Laboratories Inc. Test Method UL94.

2 Claims, No Drawings

FLAME-RETARDANT MOLDED COMPOSITION WHICH INCORPORATES A POLY(STYRENE-CO-N-PHENYLMALEIMIDE-CO-DIBROMOSTYRENE) COPOLYMER

This is a division, of application Ser. No. 685,362, filed 12/24/84.

This invention relates to polymers.

In one of its more specific aspects, this invention relates to a moldable polymer composition which, upon molding, exhibits excellent nonflammability properties.

The present invention provides a random bromostyrene-containing copolymer and a composition which comprises a flame retardant "synergist" in combination with the random styrenic copolymer. The composition upon molding, exhibits at least a 94V-1 classification when tested in accordance with Underwriters' Laboratories Inc. Test Method UL 94.

According to this invention there is provided a moldable composition comprising a random copolymer comprised of the following recurring units:

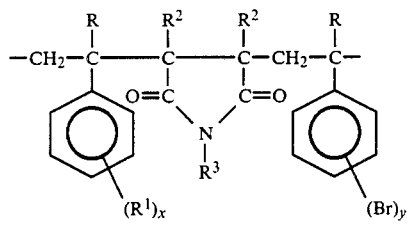

wherein each R separately represents —H, —CH$_3$, or —CH$_2$CH$_3$; R$^1$ represents —CH$_3$, —CH$_2$CH$_3$, —CH(CH$_3$)$_2$, —C(CH$_3$)$_3$, —OH, —NH$_2$, —OCH$_3$, —CO$_2$H, —CONH$_2$, or —CON(CH$_3$)$_2$; each R$^2$ separately represents —H or —CH$_3$; R$^3$ represents a C$_1$ to C$_4$ alkyl group, a chlorine or bromine substituted C$_1$ to C$_4$ alkyl group, or

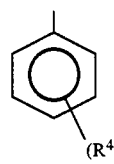

R$^4$ represents —CH$_3$, —CH$_2$CH$_3$, —CH(CH$_3$)$_2$, —C(CH$_3$)$_3$, —Cl, —Br, —OH, —NH$_2$, —OCH$_3$, —CO$_2$H, —CONH$_2$, or —CON(CH$_3$)$_2$; x represents an integer of from 0 to 3 and wherein y represents an integer of from 1 to 3; and, a flame retardant synergist.

Also, according to this invention there is provided a method for producing a molded article which comprises (1) blending a random copolymer comprised of the following recurring units:

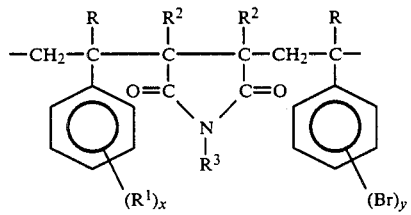

wherein each R separately represents —H, —CH$_3$, or —CH$_2$CH$_3$; R$^1$ represents —CH$_3$, —CH$_2$CH$_3$, —CH(CH$_3$)$_2$, —C(CH$_3$)$_3$, —OH, —NH$_2$, —OCH$_3$, —CO$_2$H, —CONH$_2$, or —CON(CH$_3$)$_2$; each R$^2$ separately represent —H or —CH$_3$; R$^3$ represents a C$_1$ to C$_4$ alkyl group, a chlorine or bromine substituted C$_1$ to C$_4$ group or;

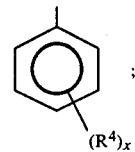

R$^4$ represents —CH$_3$, —CH$_2$CH$_3$, —CH(CH$_3$)$_2$, —C(CH$_3$)$_3$, —Cl, —Br, —OH, —NH$_2$, —OCH$_3$, —CO$_2$H, —CONH$_2$, or —CON(CH$_3$)$_2$; x represents an integer from 0 to 3; and, wherein y represents an integer of from 1 to 3 and a flame-retardant synergist; and, (2) molding the resulting blend.

According to this invention there is also provided a random copolymer comprised of the following recurring units:

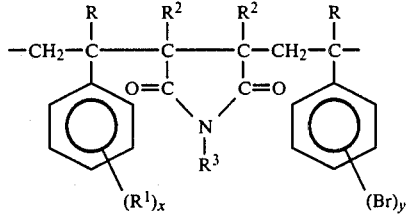

wherein each R separately represents —H, —CH$_3$, or —CH$_2$CH$_3$; R$^1$ represents —CH$_3$, —CH$_2$CH$_3$, —CH(CH$_3$)$_2$, —C(CH$_3$)$_3$, —OH, —NH$_2$, —OCH$_3$, —CO$_2$H, —CONH$_2$, or —CON(CH$_3$)$_2$; each R$^2$ separately represents —H or —CH$_3$; R$^3$ represents a C$_1$ to C$_4$ alkyl group, a chloride or bromine substituted C$_1$ to C$_4$ alkyl group or

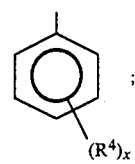

R$^4$ represents —CH$_3$, —CH$_2$CH$_3$, —CH(CH$_3$)$_2$, —C(CH$_3$)$_3$, —Cl, —Br, —OH, —NH$_2$, —OCH$_3$, CO$_2$H, —CONH$_2$, or —CON(CH$_3$)$_2$; x represents an integer of from 0 to 3; and, wherein y represents an integer of from 1 to 3.

In a preferred embodiment of this invention, the total amount of chlorine and/or bromine in the random copolymer will be within the range of from about 2 to about 16 weight percent, preferably, it will be within the range of from about 3 to about 12 weight percent.

In another embodiment of this invention the random copolymer is a poly(styrene-co-N-phenylmaleimide-co-aibromostyrene).

In another embodiment of this invention, the random copolymers can be foamed using any conventional method for foaming polmers such as, for example, extruding the random copolymer in contact with a conventional foaming agent or impregnating the copolymer with a foaming agent followed by heating the impregnated copolymer above its glass transition temperature.

In another embodiment the moldable composition of this invention which is comprised of a random copolymer and a synergist is employed as a flame-retardant blending component for thermoplastic resins; the composition serving as a flame-retardant for the resin. The composition of this invention can be blended with any suitable thermoplastic resin including styrene/maleic anhydride, styrene/acrylonitrile, polyphenylene oxide, styrene/N-phenylmaleimide, polyvinyl chloride, polycarbonate, polysulfone, polyarylate, polyester, polyamides and the like and their mixtures. Impact modified resins are also suitable such as, for example, rubber modified styrene/maleic anhydride copolymer.

The amount of random copolymer-synergist composition employed when blended with a thermoplastic resin is that amount effective to enhance the fire-retardant properties of the thermoplastic resin upon molding as compared with the flame-retardant properties of the thermoplastic resin in the absence of the random polymer-synergist composition. Typically, when employed as a flame retardant component, the random copolymer-synergist composition will be present in an amount within the range of from about 5 to about 50 weight percent based on the weight of the total composition.

In the practice of the invention, any suitable monomers can be employed to produce the first depicted recurring monomeric unit in the above general structure of the copolymer. Suitable monomers include: styrene, α-methylstyrene, α-ethylstyrene, methylstyrene, isopropylstyrene, t-butylstyrene, vinylbenzoic acid, vinyl phenol, vinyl analine, nitrostyrene, cyanostyrene, methoxystyrene, α-methyl-4-cyanostyrene, α-4-methylstyrene and the like, and their mixtures. Styrene is the preferred monomer. The random copolymer will comprise of from about 5 to about 85 weight percent recurring units of this monomer.

In the practice of this invention, any suitable monomers can be employed to produce second depicted recurring monomeric unit in the above general structure. Suitable monomers include: N-methylmaleimide, N-phenylmaleimide, N-phenylcitraconimide, N-phenyl-3,4-dimethyl-maleimide, N-(4-bromophenyl) maleimide, N-(2,4,6-tribromophenyl) maleimide, N-(4-chlorophenyl) maleimide, N-(4-cyanophenyl) maleimide, N-(4-hydroxyphenyl) maleimide, N-(4-aminophenyl) maleimide, N-(4-methoxyphenyl) maleimide, N-(4-benzamide) maleimide and the like, and their mixtures. N-phenylmaleimide is most preferred. And, although an alkyl or aryl substituted maleimide is preferred, maleimide may also be used. The random copolymer will comprise of from about 1 to about 62 weight percent recurring units of this monomer.

In the practice of this invention, any suitable brominated styrene monomer can be employed as the third depicted recurring monomeric unit in the above general structure. Suitable bromostyrenes include: monobromostyrene, dibromostyrene, tribromostyrene, α-methyl-2,4,6-tribromostyrene, α-ethyl-4-bromostyrene and their mixtures. The random copolymer will comprise of from about 4 to about 94 weight percent recurring units of this monomer.

a particularly suitable brominated styrene is available from Great Lakes Chemical Corporation and designated Great Lakes Dibromostyrene.

Great Lakes Dibromostyrene is a reactive monomer containing 61% aromatic bromine having the following general formula

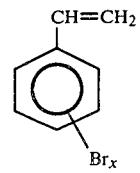

and exhibiting the following typical properties:

| appearance | light yellow liquid |
|---|---|
| density | 1.82 g/ml |
| boiling point | 95° C. (at 3 mm Hg) |
| assay, % | 99+ brominated styrenes |
| isomers | dibromo 80% |
| | monobromo 10% |
| | tribromo 10% |

If the random copolymer of this invention is used to produce molded articles the number average molecular weight of the copolymer should be at least 30,000, preferably at least 80,000 to about 500,000.

To produce a moldable composition of this invention the random copolymer can be conventionally blended with any suitable flame-retardant synergist. The synergist will typically be employed in an amount within the range of from about 1 to about 10, preferably from about 1 to about 5 weight percent of the composition (copolymer plus synergist).

Suitable synergists include: antimony trioxide, antimony pentoxide, arsenic trioxide, arsenic pentoxide, zinc sulfate, zinc oxide, zinc borate, bismuth oxide, molybdenum oxide, tungsten oxide, stannous oxide and the like, and their mixtures. The preferred synergist is antimony trioxide.

Optionally, the molding composition can include other ingredients. Such as extenders, smoke suppresants, antioxidants, reinforcing fillers, processing aids, pigments, stabilizers, mold release agents and the like, for their conventionally employed purpose.

The N-(brominated or chlorinated phenyl)maleimides which are suitable for use as one of the recurring monomeric units in the random copolymers of this invention are not known to be commercially available. Accordingly, Example I demonstrates the preparation of N-(2,4,6-tribromophenyl)maleimide.

This invention is further demonstrated by the following examples.

EXAMPLE I

This example demonstrates the preparation of N-(2,4,6-tribromophenyl)maleimide.

Into a reaction vessel were added and mixed 100 g. (0.303 mole) of 2,4,6-tribromoanaline, 68.34 g (0.697 mole) of maleic anhydride, and 5.16 g (0.379 mole) of zinc chloride.

The resulting mixture was heated at a temperature within the range of from about 139° to 148° C. for about 2 hours.

The resulting reaction product was extracted with xylene, filtered and water washed.

The xylene solvent was removed and the resultant product N-(2,4,6-tribromophenyl)maleimide was recovered at a yield of about 94%.

EXAMPLE II

This example demonstrates the preparation of a copolymer of this invention which contains recurring units of styrene, N-phenylmaleimide and dibromostyrene.

Into a one-gallon stirred reactor were charged 2367 g of methyl ethyl ketone, 313 g styrene, 577 g N-phenylmaleimide and 125 g of Great Lakes Dibromostyrene monomer.

About 0.8 g of benzoyl peroxide was added to the reaction mixture and the mixture heated to 75° C.

The resulting polymerization reaction was allowed to proceed for five hours, and then 5 g of butylated hydroxy toluene ("BHT") were added.

The copolymer was recovered by precipitation from methanol, filtered, washed with methanol and dried under vacuum.

The recovered random copolymer was found to contain 54.3% N-phenylmalemide and 9.8% dibromostyrene (6.0% bromine).

The copolymer was found to have a glass transition temperature of 224° C. (by Differential Scanning Calorimetry "DSC"), a number average molecular weight of 147,000 and a weight average molecular weight of 367,000 as measured by gel permeation chromotography using polystyrene standards.

EXAMPLE III

This example demonstrates the preparation of a copolymer of this invention which contains recurring units of styrene, N-phenylmaleimide and dibromostyrene.

Into a one-pint citrate bottle were charged 57.4 g N-phenylmaleimide, 33.3 g styrene, and 5.5 g Great Lakes Dibromostyrene monomer.

Next, about 0.03 g benzoyl peroxide initiator was added.

The bottle was flushed with nitrogen, tightly sealed and placed in a bottle polymerizer at 90° C. and polymerization was allowed to proceed for 2.5 hours.

The resultion copolymer was dissolved in THF and precipitated in methanol, filtered, washed with methanol and dried under vacuum.

The copolymer exhibited a glass transition temperature of 206° C. (by DSC) and was found to contain 51% N-phenylmaleimde and 5.7% dibromostyrene (3.5% bromine).

EXAMPLE IV

This examples demonstrates the preparation of a copolymer of this invention which contains recurring units of styrene, N-(2,4,6tribromophenyl)maleimide and dibromostyrene.

Into a one-gallon stirred reactor is charged 2367 g of methyl ethyl ketone, 313 g styrene, 577 g of the N-(2,4,6-tribromophenyl)maleimide produced in Example I and 125 g of dibromostyrene monomer (Great Lakes).

About 0.8 g of benzoyl peroxide is added to the reaction mixture and the mixture is heated to 75° C.

The resulting polymerization reaction is allowed to proceed for five hours, and then 5 g of BHT are added.

The copolymer is recovered by preicipitation from methanol, filtering, washing with methanol and drying under vacuum.

EXAMPLE V

The copolymers produced in Examples 2 and 3 were separately melt blended (at 550° F. and 530° F., respectively) with 4% antimony trioxide based on the weight of the total composition (copolymer plus synergist). The resulting blends were separately molded and the molded blends were tested for flammability in accordance with Underwriters Laboratories UL 94 (UL 94 Standard for Tests for Flammabiliy of Plastic Materials For Parts in Devices and Appliances, UL 94, third edition Jan. 24, 1980).

In this UL 94 Vertical Burning Test, the molded copolymer test specimen was supported from the upper end, with the longest dimension vertical, by a clamp on a ring stand so that the lower end of the specimen was 1" above the top of the burner tube. The burner was then placed remote from the sample, ignited, and adjusted to produce a blue flame 1" in height. The test flame was placed centrally under the lower end of the test specimen and allowed to remain for 10 seconds. The test flame was then withdrawn, and the duration of flaming or glowing combustion of the specimen was noted. If flaming or glowing combustion of the specimen ceased within 30 seconds after removal of the test flame, the test flame was again placed under the specimen for 10 seconds immediately after flaming or glowing combustion of the specimen stopped. The test flame was again withdrawn, and the duration of flaming or glowing combustion of the specimen was noted. If the specimen dripped flaming particles or droplets while burning in this test, these drippings were allowed to fall onto a horizontal layer of cotton fibers (untreated surgical cotton) placed one foot below the test specimen. Significantly flaming particles were considered to be those capable of igniting the cotton fibers. The duration of flaming or glowing combustion of vertical specimens after application of the test flame (average of 5 specimens with 10 flame applications) should not exceed 25 seconds (maximum not more than 30 seconds) and the portion of the specimen outside the clamp should not be completely burned in the test.

Materials which comply with the above requirements and do not drip any flaming particles or droplets during the burning test are classified as "V-1". Materials which comply with the above requirement but drip flaming particles or droplets which burned briefly during the test are classified as "V-2". A "V-0" rating is given to materials wherein the duration of flaming or glowing combustion averages less than 5 seconds under the conditions specified above.

the results of the UL 94 testing was as follows:

| Molded Composition of | UL 94 (5" × $\frac{1}{2}$" × $\frac{1}{8}$" bar) |
| --- | --- |
| Example 2 | V-0 |
| Example 3* | V-0 |

*Due to small quantity of polymer only 2 specimens tested

It will be evident from the foregoing that various modifications can be made to this invention. Such, however, are considered as being within the scope of the invention.

What is claimed is:

1. A method for producing a molded article which comprises (1) blending a random copolymer comprised of the following recurring units:

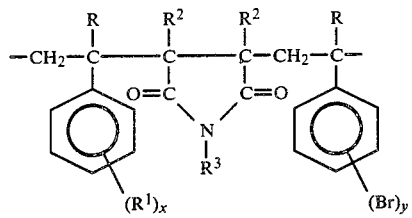

wherein each R separately represents —H, —CH$_3$, or —CH$_2$CH$_3$; R$^1$ represents —CH$_3$, —CH$_2$CH$_3$, —CH(CH$_3$)$_2$, —C(CH$_3$)$_3$, —OH, —NH$_2$, —OCH$_3$, —CO$_2$H, —CONH$_2$, or —CON(CH$_3$)$_2$; each R$^2$ separately represents —H or —CH$_3$; R$^3$ represents a C$_1$ to C$_4$ alkyl group, a chlorine or bromine substituted C$_1$ to C$_4$ group, or

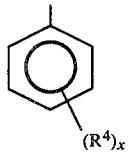

R$^4$ represents —CH$_3$, —CH$_2$CH$_3$, —CH(CH$_3$)$_2$, —C(CH$_3$)$_3$, —Cl, —Br, —OH, —NH$_2$, —OCH$_3$, —CO$_2$H, —CONH$_2$, or —CON(CH$_3$)$_2$; x represents an integer from 0 to 3; and, wherein y represents an integer of from 1 to 3; and, a flame-retardant synergist and, (2) molding the resulting blend.

2. The method of claim 1 comprising molding said blend in contact with a reinforcing filler.

* * * * *